S. P. BURTON.
AWNINGS FOR BIRD-CAGES.
No. 188,100. Patented March 6, 1877.
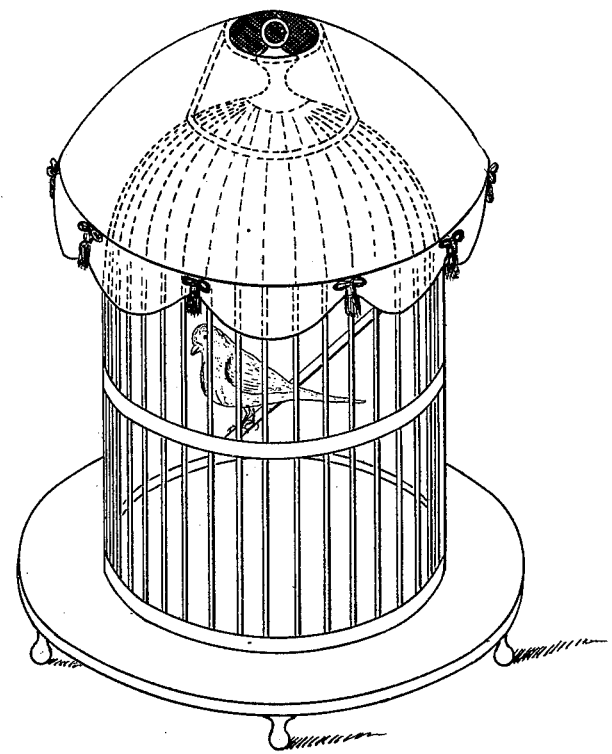
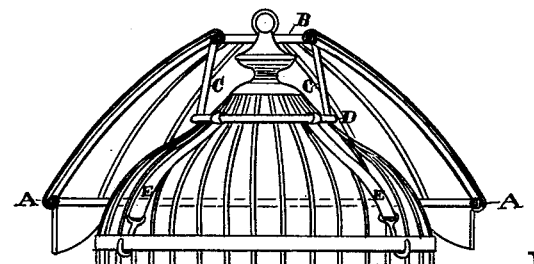
Witnesses　　　　　　　　　　　Inventor

UNITED STATES PATENT OFFICE.

SUSANNAH P. BURTON, OF SAN FRANCISCO, CALIFORNIA.

IMPROVEMENT IN AWNINGS FOR BIRD-CAGES.

Specification forming part of Letters Patent No. 188,100, dated March 6, 1877; application filed January 15, 1877.

*To all whom it may concern:*

Be it known that I, SUSANNAH P. BURTON, of the city and county of San Francisco, and State of California, have invented a Bird-Cage Awning; and I do hereby declare the following to be a full, clear, and exact description thereof, reference being had to the accompanying drawings.

My invention relates to certain improvements in awnings or shelters, such as are employed to protect birds in cages from wind, rain, and particularly from the sun.

These awnings, as at present constructed, have a hole made to fit closely over the knob at the top of the cage, and the awning thus fits down upon the top of the cage, so that when a hot sun beats upon it the air is confined, and the heat of the interior of the cage becomes unendurable, and will often be fatal to delicate birds.

My invention consists in constructing an awning-frame with standards which elevate the awning some distance above the cage, thus providing a free circulation of air through the space above the cage, and not only sheltering the bird from direct action of the sun's rays, but protecting it from the more fatal results of overheating and sun-stroke.

In the accompanying drawings, Figure 1 is a perspective view of my awning fitted to a cage. Fig. 2 is a sectional view.

A is the outer, and B the inner, ring of my awning. These rings are united by radial arms, which support the outer covering. This covering may be made of any suitable ornamental material. The inner ring B stands at a considerable height above the outer ring, so as to conform the covering to the shape of the cage-top, and from this inner ring arms or standards C extend downward, and are united to a supplemental ring, D, which may be made of a size between that of the rings A and B, or so as to fit upon the top of the cage. Elastic strips E are attached to the ring D, and are provided with hooks F at their outer ends, so that the whole may be firmly secured to the cage. By this construction a free circulation of air is allowed within the awning, which is elevated above the cage sufficiently for the purpose.

Having thus described my invention, what I claim as new, and desire to secure by Letters Patent, is—

An awning for cages, consisting of the outer and inner rings A B, with their covering, said awning being provided with the standards C and supplemental ring D, for elevating it above the cage, and the elastic securing devices E, substantially as herein described.

In witness whereof I have hereunto set my hand and seal.

SUSANNAH P. BURTON. [L. S.]

Witnesses:
  GEO. H. STRONG,
  FRANK A. BROOKS.